Patented Dec. 22, 1925.

1,566,694

UNITED STATES PATENT OFFICE.

JOHN B. RAILSBACK, OF SHREVEPORT, LOUISIANA.

METHOD OF ELECTROLYTICALLY PRODUCING ALUMINUM.

No Drawing. Application filed October 20, 1924. Serial No. 744,827.

*To all whom it may concern:*

Be it known that I, JOHN B. RAILSBACK, a citizen of the United States, residing at Shreveport, in the parish of Caddo and State of Louisiana, have invented certain new and useful Improvements in Methods of Electrolytically Producing Aluminum, of which the following is a specification.

This invention relates to certain new and useful improvements in methods of electrolytically separating or producing aluminum.

At present aluminum is extensively produced by the Hall and the Heroult processes, in which processes alumina is fused or dissolved in a molten mixture of haloid salts and separated by the electric current into metallic aluminum and oxygen as if it was an electrolyte.

The various forms of electric furnaces utilized for the production of aluminum, magnesium, calcium, etc., are adaptable to my process, the most material modification being the addition of means to recover the valuable by-product.

My improvement is concerned with the chemical problems involved and not with the mechanical problems, the details of which have been well worked out. I propose to modify the chemical procedures of the electrolytic process while continuing to utilize the present mechanical procedures and appliances My improvement is concerned with the composition of and the method of compounding the molten mixture from which aluminum is to be electrolytically separated, during which separation when my process is used, valuable by-products may be recovered.

The molten mixture heretofore used as a solvent for alumina consists of various combinations of the fluorides and chlorides of aluminum, sodium, calcium, etc.; sodium or potassium always being present, the molten mixtures usually subjected to the electric current containing ions of aluminum, sodium, calcium, fluorine, chlorine and oxygen, which mixture is fused in the electric furnace and electrolyzed. In like manner, the mixture I use is fused before or after introduction into the furnace and electrolyzed. The essential difference between mine and the older processes being the nature and composition of the mixture introduced. I do not propose novel operation, but an improved mixture to be operated upon, or to be subjected to the action of the electric current by methods already widely used, together with a method of compounding the improved mixture.

The use of the anhydrous chloride or sulfide of aluminum in place of alumina has been suggested so as to liberate the metal at a lower voltage and save electric power. These proposals although feasible, fail to reduce the cost of the produce, because the cost of preparing either the chloride or the sulfide of aluminum in the anhydrous form is greater than the cost of the electric power thereby rendered unnecessary.

In any possible process for the electrolytic production of aluminum, every compound entering into the molten mixture from which it is to be separated, must be anhydrous, and most anhydrous compounds of aluminum are difficult and expensive to prepare. In my process, I use the oxide, the cheapest possible anhydrous compound. Yet, I liberate simultaneously with the metallic aluminum, some element of less affinity for aluminum than oxygen. This I achieve by modifying the composition of the molten mixture which is subjected to the electric current.

In a fluid mixture containing various ions usually the first pair to be separated by the electric current at the lowest voltage, is that oppositely charged pair attracted to each other by a smaller affinity than any other pair; therefore, in a molten mixture such as above described, containing ions of aluminum, sodium, calcium, fluorine, chlorine, and oxygen, the first pair I would expect to be separated would be aluminum and chlorine; the voltage required to separate aluminum and oxygen being 2.8; that required to separate aluminum and chlorine being 2.0, but the separation of aluminum and chlorine from such a mixture would leave sodium oxide in solution, and the affinity of aluminum for oxygen being greater than that of sodium, sodium oxide would be reduced by the liberated aluminum; also the liberated chlorine would react upon the oxide of sodium. The presence of sodium or potassium in a mixture such as the above, containing combined oxygen, renders impossible the electrolytic separation simultaneously with the aluminum of any negative substance of less affinity for aluminum than oxygen.

This difficulty caused by the presence of sodium, I overcome by the elimination of sodium, replacing it with some of the metals, whose oxides are not reducible by aluminum, —namely, lithium, beryllium, magnesium, calcium, strontium, and barium, which metals hold the oxygen in combination while aluminum is electrolytically liberated at one electrode and some element of less affinity for it than oxygen at the other.

I further modify the composition of the molten mixture by introducing therein ions of substances of lower affinity for aluminum than oxygen, namely, chlorine, bromine, iodine, sulfur, selenium, or tellurium, aluminum being separated from these at lower voltages than from oxygen, thereby realizing the saving of electric power sought by the proponents of the use of anhydrous chloride and sulfide of aluminum.

The molten mixture from which I electrolytically separate aluminum is compounded from aluminum oxide and the haloids, sulfides, selenides, and tellurides of aluminum and of those metals whose oxides are not reduced by aluminum. The chemical and physical facts involved in compounding the molten mixture from which aluminum is electrolytically separated are that at the temperatures used, the haloids of aluminum and of the metals electro-positive to it are fusible and miscible with each other, while their oxides are difficultly fusible at these temperatures, but are soluble to a limited extent in the fluid haloid mixture.

Many changes in the composition of the "molten bath" have been proposed in order to modify in a desirable way its density, fusion point, cost, and solvent powers for alumina, but never with the idea of changing the electro-negative element to be liberated simultaneously with aluminum; or of eliminating by precipitation undesirable compounds which may be incidentally introduced or formed.

Any desirable modifications of its density, fusion point, cost or solvent power for alumina achieved by my method, are merely incidental, and beside the main point of my invention.

The substitution in part of lithium for potassium for the purpose of achieving some of the above desirable results is described and claimed in the United States patent to Hall, No. 400,664. In the present process, I substitute entirely lithium for potassium, incidentally achieving some of the above desirable results, but for the declared purpose of making possible the liberation of chlorine or sulphur instead of oxygen, simultaneously with aluminum.

Aluminum may be separated over a wide range of temperature, (750° to 1000°) and at various current densities, and could be recovered if necessary from baths of greater specific gravity than the metal, as is done in the case of magnesium, and alumina is soluble in the most varied haloid mixtures, making possible the use of molten baths of great variety, the existing extensive knowledge of which problems I utilize.

In my experiments, I have observed the evolution of sulfur and chlorine instead of oxygen, and by chemical analysis of the residual bath, have found oxygen to the amount of four times a chemical equivalent of the aluminum.

I have compounded my baths according to published formulas, merely substituting for potassium and sodium, some other metal more electro-positive than aluminum. For instance, I have used a bath composed of seven parts $Li_3AlF_6$ and one part of $CaF_2$ into which I fed a mixture of alumina and either the sulfide or chloride of lithium, the bath in the above instance being lighter than aluminum and fusing below 800°.

Hall describes his process as "dissolving alumina in a molten bath of fluorides of aluminum and of a metal or metals more electro-positive than aluminum, and then passing the electric current through the fused mass." His conception and that generally held since being that the "molten bath" acts as an inert solvent, not participating in the reaction.

In order to emphasize a broader conception, I discard his term "molten bath" and use in its place the expression "molten mixture," not pretending to distinguish between solvent and solute.

This broader conception will make many details clear. For instance, if into a suitable molten haloid mixture saturated with calcium oxide, I simultaneously introduce aluminum oxide and calcium sulfide, calcium oxide is bound to be precipitated, in which instance by the simultaneous introduction of alumina and calcium sulfide, I actually introduce aluminum sulfide without changing the nature of the so-called molten bath. In like manner, aluminum and magnesium chloride can be simultaneously introduced into a "molten bath" saturated with magnesia and in effect introduce aluminum chloride into the mixture without changing the nature of the "molten bath."

To introduce into the molten mixture negative ions of less affinity for aluminum than oxygen while in combination with aluminum, entails the expensive preparation of their anhydrous aluminum compounds, which expensive auxiliary process I avoid by introducing them while they are combined with some of the metals whose oxides are not reducible by aluminum. This has not been heretofore proposed, and is one of the principles I desire to protect.

To realize the advantage of my method in compounding the molten mixture, consider the simultaneous introduction of the ions of aluminum and sulfur. To introduce them in combination as aluminum sulfide entails the expensive preparation of the anhydrous compound, but the simultaneous introduction of aluminum oxide into the same mix with the sulfide of lithium or calcium achieves the same result at a fraction of the cost and is a preferred embodiment of my process.

Another preferred procedure is to introduce alumina into a fused mixture containing magnesium, beryllium or lithium chloride and electrolyze.

The advantages arising from the use of the sulfur ion are due to its extreme cheapness and entire lack of poisonous properties. Additional economy of electric power is to be realized by the use of ions of selenium and tellurium.

In addition to its cheapness, an advantage to be derived from the use of the chlorine ion is that at comparatively low temperatures, electrolytically liberated chlorine reacts with the carbon anode, therefore, in addition to their cheapness the use of chlorides to supply the ion to be simultaneously liberated with aluminum, makes possible the manufacture of carbon tetrachloride as a by-product, four pounds of the chloride to one of the aluminum, which at present relative prices is about as valuable as the main product. Likewise, carbon disulfide may be produced as a by-product.

In those processes where oxygen is liberated simultaneously with aluminum, the anode is consumed as carbon monoxide, one half of the affinities of carbon remaining unsaturated. But when chlorine or sulfur are liberated, no affinities remain unsaturated. Assuming the waste of carbon to be proportional to that chemically consumed, only half as much carbon is used per pound of aluminum produced; in addition, there remains the possibility of separating some negative ion at so low a temperature that the anode will not be consumed at all.

To summarize, my process consists:

1st. Of the elimination of sodium and potassium from the molten mixture from which aluminum is to be electrolytically separated because if combined oxygen be a constituent the presence of sodium or potassium renders impossible the simultaneous separation of aluminum and any negative element of less affinity for it than oxygen.

2nd. Of the substitution of those metals whose oxides are not reducible by aluminum for sodium or potassium, because of their ability to hold oxygen in combination, while some element for which aluminum has a less affinity is liberated at the anode.

3rd. Of the introduction into the molten mixture of ions of elements for which aluminum has a less affinity than for oxygen, which elements if sodium or potassium be absent are liberated simultaneously with aluminum by the electric current while combined oxygen remains in solution.

4th. Of the introduction of ions of lower affinity for aluminum than the ion of oxygen into the molten mixture containing alumina, while in combination with some metal other than aluminum with which they form cheaply prepared anhydrous compounds.

5th. Of so constituting the "molten bath" that upon the simultaneous introduction of two compounds, which contain two ions which it is desired to electrolytically separate these two ions will remain in solution while the other two will precipitate or crystallize out, leaving the "molten bath" of the same composition as the beginning.

The process above summarized enables us to electrolytically separate aluminum with great saving of electric power, yet without additional costly chemical processes, to greatly cut the consumption of anode carbon, to produce by-products of value, and to eliminate the present loss of cryolite, which will not be decomposed at those voltages sufficient to decompose the chloride or sulfide of aluminum.

Of the above summarized essentials of my improvement, the use of other negative ions than those of oxygen such as sulfur, has been suggested but no practical method of accomplishing it proposed. No other idea involved in my improvement has even been suggested.

The elimination of sodium and potassium is not to be treated as a negative proposal because the discovery that they are the trouble makers in all existing processes, while entirely novel and new, is also the fundamental discovery out of which my invention grew, and the positive act of eliminating the trouble-maker is the basic improvement which makes all the rest possible.

I claim:

1. A bath for use in the production of aluminum comprising compounds of aluminum, and a metal whose oxide is not reducible by aluminum.

2. The herein described mixture for use in electrolytically separating aluminum comprising a mixture of compounds of aluminum and another metal whose oxides are not reducible by aluminum with negative elements, the affinity of one of which for aluminum is less than that of oxygen.

3. A bath for use in the electrolytic production of aluminum comprising a mixture of compounds of aluminum and negative elements of less affinity for aluminum than oxygen in combination with positive elements whose oxides are not reducible by aluminum.

4. The process of separating aluminum electrolytically which comprises introducing aluminum oxide into a bath, forming an oxide not reducible by aluminum and separating the aluminum in combination with a negative element whose affinity for aluminum is less than that of oxygen.

5. The process of separating aluminum electrolytically which comprises introducing aluminum oxide into a bath, forming an oxide not reducible by aluminum and separating the aluminum in combination with a negative element whose affinity for aluminum is less than that of oxygen, said bath being substantially free of sodium and potassium.

6. The process of electrolytically separating aluminum which comprises simultaneously introducing aluminum oxide and a compound of a more electro-positive element and a negative element of less affinity for aluminum than oxygen into a bath saturated with the oxygen ion, whereby the oxide of the more electro-positive element will crystallize out maintaining the composition of the solvent bath constant.

In testimony whereof, I affix my signature.

JOHN B. RAILSBACK.